Figure 1:
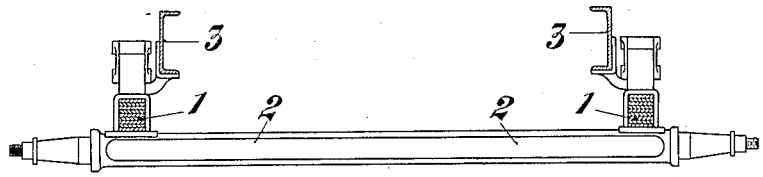

No. 878,316. PATENTED FEB. 4, 1908.
G. SCHWARZ.
SPRING FOR VEHICLES.
APPLICATION FILED MAR. 1, 1907.

2 SHEETS—SHEET 1.

Witnesses:

Inventor
Georg Schwarz
By
James L. Norris
Atty

No. 878,316. PATENTED FEB. 4, 1908.
G. SCHWARZ.
SPRING FOR VEHICLES.
APPLICATION FILED MAR. 1, 1907.

2 SHEETS—SHEET 2.

Witnesses:

Inventor
Georg Schwarz
By
James L. Norris.
Atty.

UNITED STATES PATENT OFFICE.

GEORG SCHWARZ, OF EISENACH, GERMANY.

SPRING FOR VEHICLES.

No. 878,316.  Specification of Letters Patent.  Patented Feb. 4, 1908.

Application filed March 1, 1907. Serial No. 359,992.

*To all whom it may concern:*

Be it known that I, GEORG SCHWARZ, manager, a subject of the King of Würtemberg, residing at Eisenach, Grand Duchy of Saxe-Weimar-Eisenach, Germany, have invented certain new and useful Improvements in or Relating to Springs for Vehicles, of which the following is a specification.

Hitherto in all spring-suspended vehicles, the springs 1 have been rigidly secured to the axles 2, and only the spring ends linked to the carriage frame 3 in a more or less movable manner. As long as the two springs 1 of a carriage axle 2 yield to the same extent, so that the axle comes nearer to or farther away from the frame while remaining parallel to it, the action of the spring is free and not interfered with (see Figure 1). As soon, however, as the unevenness of the road causes one spring 1 to yield more than the other, and the carriage axle 2 consequently comes into an oblique position relatively to the carriage frame (see Fig. 2), there are strains on the springs and the spring-suspensions, which prevent the springs from acting freely and easily. This renders the movement of the vehicle hard and inelastic, and the springs practically do not act.

The object of this invention is to obviate the above drawbacks. In accordance with it, the springs 1 are no longer rigidly connected to the carriage axles, but are rotatably movable thereon.

Figure 2:
Figure 3:
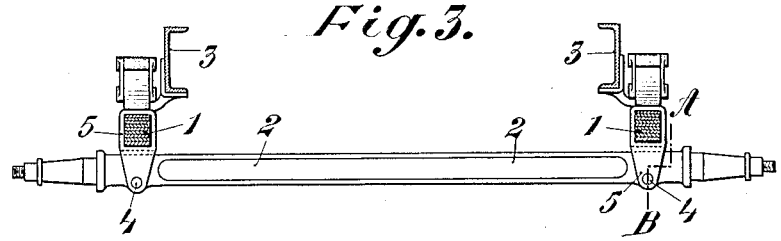
Figure 4:
Figure 5:
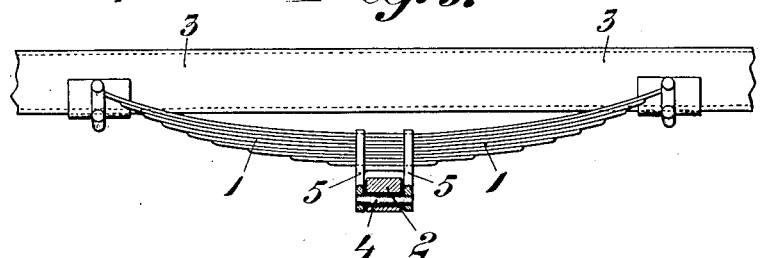
Figure 6:
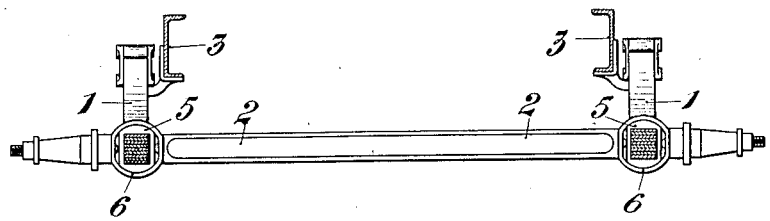
Figure 7:
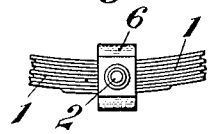
Figure 8:
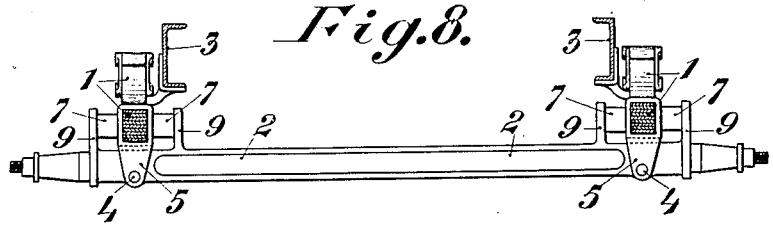
Figure 9:
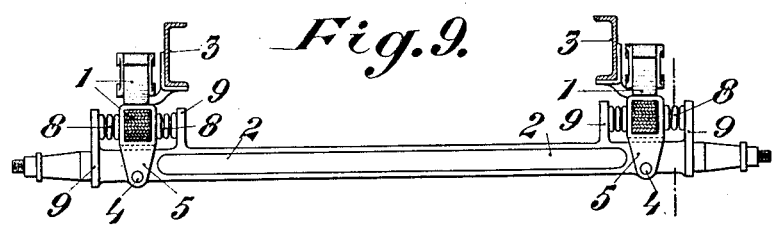
Figure 10:
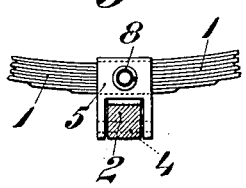

In the drawings: Figs. 1 and 2 show the old axle spring suspension. Fig. 3 shows the axle spring suspension according to the invention when the carriage is driving on the flat. Fig. 4 shows the same axle when the carriage is driving on a slope. Fig. 5 shows the springs in elevation and section on the line A—B of Fig. 3. Fig. 6 is a view in elevation of a modified form of the invention in which the spring shoe 5 surrounding the spring 1 can turn in the correspondingly formed strip 6 of the axle 2 of the vehicle; Fig. 7 is a fragmentary side view thereof. Fig. 8 shows an arrangement similar to that shown in Figs. 3 and 4 with lateral buffers for limiting the movement of the springs. Figs. 9 and 10 show helical springs acting between the stops instead of the buffers shown in Fig. 8.

Owing to the springs 1 being connected so as to be rotatably movable on the carriage axle 2, they remain parallel to the carriage frame even when the axle is oblique, and therefore there is no twisting of or strain on, the springs 1, as they can freely and easily move with their collar 5 on the bolt 4 passing transversely through the axle 2. The consequence is that the vehicle is very springy and free from shocks even when the road is rough.

In another construction shown in Figs. 6 and 7, the collar 5 surrounding the spring 1, can rotate in a correspondingly shaped bracket 6 of the carriage axle 2. In Fig. 8 the spring collar 5 is limited in its lateral movement by the buffer 7.

In the construction shown in Figs. 9 and 10, the lateral movement of the spring collar 5 is limited by helical springs 8; 9 are stops for the buffer 7 or for the helical springs 8, secured to the carriage axle 2.

What I claim is:

1. A vehicle spring having pivotal connection with an axle to allow free movement to the latter and the spring, and lateral tension means coöperative with the pivotal axle connection.

2. In a vehicle body and axle, a spring, brackets carried by the body, links connecting the spring with the brackets, and a pivotal bracket carried by the axle and having connection with said spring, whereby the latter and the axle are freely movable with respect to the body.

In testimony whereof I have hereunto set my hand in presence of two subscribing witnesses.

GEORG SCHWARZ.

Witnesses:
ALFRED RAUH,
ERNST GUSGORINN.